R. F. GOECKE.
ENAMELED KETTLE.
APPLICATION FILED MAR. 21, 1916.

1,290,733.

Patented Jan. 7, 1919.
2 SHEETS—SHEET 1.

INVENTOR
Rudolf F. Goecke
BY
His ATTORNEY

R. F. GOECKE.
ENAMELED KETTLE.
APPLICATION FILED MAR. 21, 1916.

1,290,733.

Patented Jan. 7, 1919.
2 SHEETS—SHEET 2.

UNITED STATES PATENT OFFICE.

RUDOLF F. GOECKE, OF ELYRIA, OHIO, ASSIGNOR TO THE ELYRIA ENAMELED PRODUCTS COMPANY, OF ELYRIA, OHIO, A CORPORATION OF OHIO.

ENAMELED KETTLE.

1,290,733.  Specification of Letters Patent.  Patented Jan. 7, 1919.

Application filed March 21, 1916. Serial No. 85,621.

*To all whom it may concern:*

Be it known that I, RUDOLF F. GOECKE, a subject of the Emperor of Germany, residing at Elyria, in the county of Lorain and State of Ohio, have invented certain new and useful Improvements in Enameled Kettles; and I do hereby declare the following to be a full, clear, and exact description of the invention, such as will enable others skilled in the art to which it appertains to make and use the same.

My invention relates to enameled kettles and the like, the object being to provide readily detachable means where the enamel upon the kettle is most exposed and most often injured. The life of an enameled kettle, of course, depends upon the enamel, especially in work where acids are employed, for as soon as the enamel is cracked or broken and the acid gains access to the metal, the kettle wall is soon destroyed. It will also be understood that the enamel is easily broken or cracked, and I aim to provide a device in which I make detachable that portion of the kettle which is most exposed and most easily and most often injured. I also provide means wherein it is easy to supply a new member where the old one has been removed. I further aim to provide means of the character described which can be easily removed and another substituted by unskilled labor, which is generally employed with devices of this character.

Other objects of my invention and the invention itself will probably be better understood from a description of an embodiment of my invention.

Figure 1:
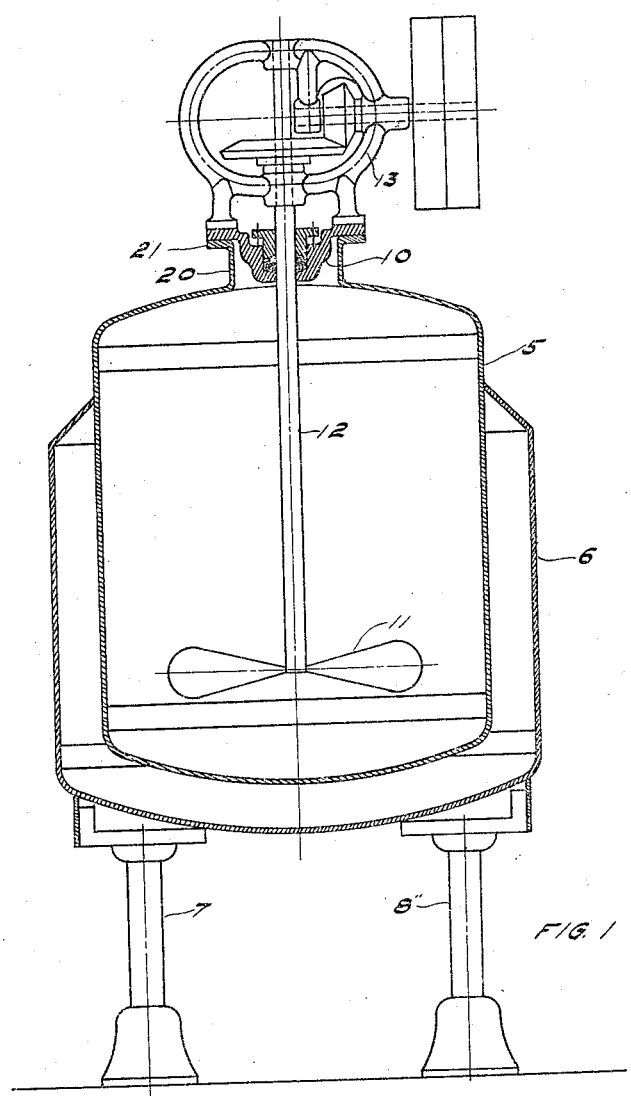
Figure 1 is a cross section through a kettle showing an embodiment of my invention in a general way.
Figure 3:
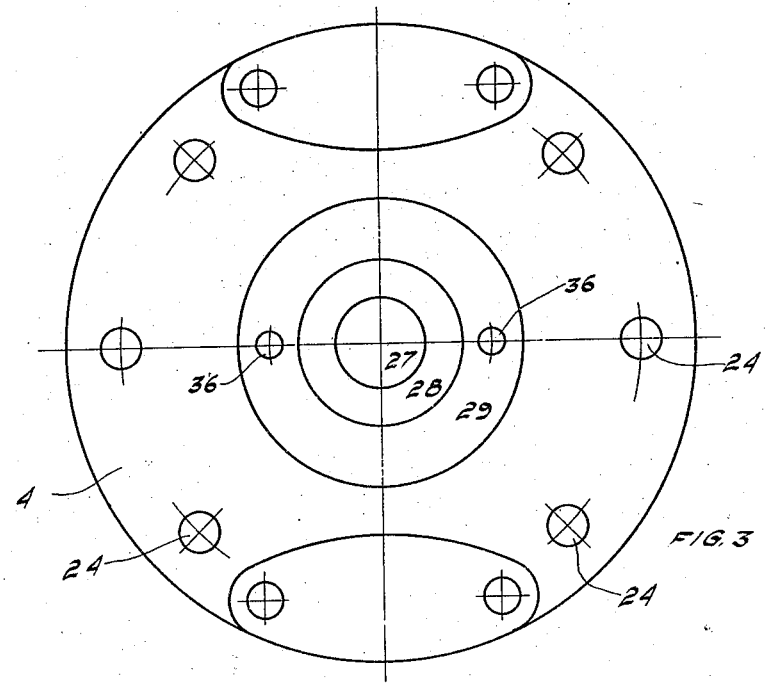
Fig. 3 is a top view of the member 4 shown in Figs. 1 and 2.

At 5 is shown a kettle which is mounted in a jacket 6, both the kettle and jacket being supported upon pedestals 7 and 8. The kettle is enameled, as shown at 9 and is provided with an opening 10, here shown in the top of the kettle, the object of the opening being to provide an entrance for means for operating upon the contents of the kettle, such as a stirrer 11, the shaft of which is shown at 12 and which extends through the opening 10. Means are illustrated at 13 through which the shaft and the stirrer are operated. The rotation of the shaft 12 places a strain upon that portion of the enamel which is connected therewith. Of course, this strain will be greater upon that portion 14 of the enamel than upon the portions which are more distant from the shaft.

I provide mechanism for isolating the larger portion of the enamel from the shaft and so reducing the effect of the shaft upon it that there is little or no danger of injuring it, and where it is not possible to do this, as in the case of the enamel at 14, I mount this enamel upon a removable member 4 which can be readily taken out and another member substituted in its stead when the enamel is injured. I also place the member 4 at the top of the kettle where the contents of the kettle are less in contact with the walls thereof than at other points, so that when the enamel 14 is broken or injured, there will be less action upon the metal of the member 4 than at other portions of the kettle. I also make the walls of the member 4 thick, so that it will take longer for the acid to destroy them than the thinner walls of the rest of the kettle.

The top of the kettle is provided with a neck 20 about the opening 10, and the top of this neck is provided with a flange 21, preferably turned outwardly at right angles to the neck 20. This flange is provided with a plurality of openings 22.

Figure 2:
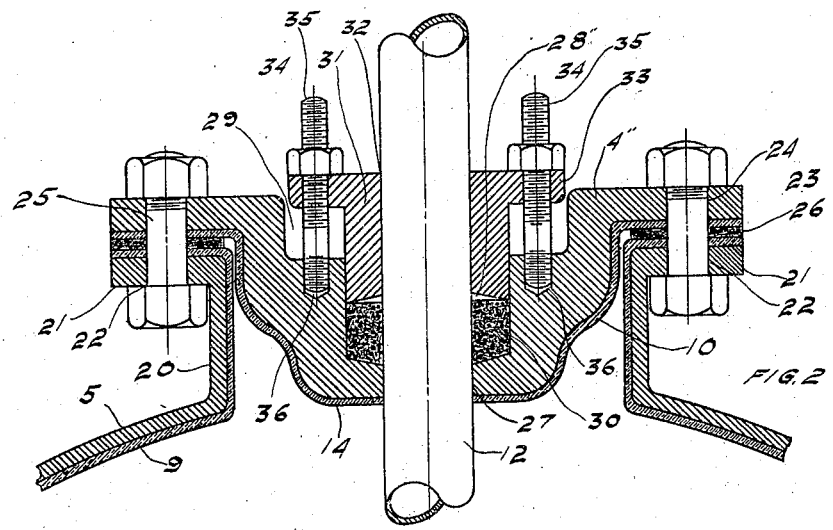
Fig. 2 is a section through a portion of the top of the embodiment shown in Fig. 1, illustrating more in detail the parts which more particularly relate to my invention.

The member 4 is provided with a flange 23 which is provided with a plurality of openings 24, corresponding to the openings 22 in the flange 21. The member 4 is connected to the kettle by bolts 25 or other suitable fastening means which pass through the openings in the flanges 21 and 23. A gasket 26 is preferably connected between the flanges, as illustrated in Fig. 2. An opening 27 is provided for the shaft through which it passes into the interior of the kettle. About this shaft a packing pocket 28 is formed in the member 4 and about the top of this pocket a cell 29 is formed. A mass of packing 30 is placed in the pocket 28. In the form shown, this packing is compressible, being preferably a fibrous packing. A hollow ring 31 provided with an opening 32 through which the shaft passes is of such size as to fit into the pocket and is mounted on top of the packing. The ring 31 is provided with a flange 33 provided with a plurality of openings 34 through which project means for connecting the member 31 to the member 4. In the form shown, bolts 35 are employed whose threaded ends engage threads in holes 36 in the bottom of the cell 29.

It will readily be understood that when the enamel 14 upon the member 4 is injured in any way, such as by the action of the shaft and the member 4 becomes useless through the action of the contents of the kettle upon the metal through the opening or crack in the enamel, the member 4 may readily be removed by simply taking out the bolts, and a new member substituted, even by unskilled labor, greatly lengthening the life of the kettle and cheapening the use of devices of this type, especially where strong acids are employed.

I have illustrated these particular embodiments of my invention and the details shown for the purpose of better describing my invention. I do not wish to be limited to such form and details, it being readily understood by those skilled in the art that many departures may be made from both the form and details without departing from the spirit of the invention.

I claim:—

1. In an enameled kettle, the combination of a main portion and a detachable wall portion connected thereto, said detachable wall portion being provided with an opening through which projects movable mechanism for operating upon the contents of the kettle, said detachable portion being provided with relatively thick walls and being enameled on the interior.

2. In an enameled kettle, the combination of a main portion provided with a small opening at the top, a member for closing said opening detachably connected to the main portion of the kettle, said member being provided with an opening through which there projects from the outside of the kettle into the interior thereof a portion of a mechanism employed for operating on the contents of the kettle, the portion of the mechanism projecting through the opening being movable in said opening, the walls of said detachable member being thicker than the walls of the kettle and the portion of the detachable member fronting the interior of the kettle being enameled.

3. In an enameled kettle, the combination of a body portion provided with an opening therein through which a portion of an agitating device projects, a member provided with an opening for the portion of the agitating device projecting through said kettle opening for closing the opening in the kettle, said member being thicker walled than the kettle and having a depression therein comprising a lower smaller packing chamber, or cell and an upper larger chamber or cell, said chambers or cells and said opening in said member being concentric, a mass of packing in the packing chamber and a ring of substantially the diameter of the packing chamber to retain the packing in said chamber provided with a flange of substantially the size of the larger or upper chamber, means to attach said member to close the opening in the kettle and means to attach said ring through its flange to said member.

4. In a kettle, the combination of a body portion of the kettle provided with an opening for a rotatable shaft, a cover for said opening provided with a hole for said shaft, said cover provided with a lower packing chamber and a larger upper chamber, packing in said packing chamber and a ring projecting in the packing chamber for retaining the packing therein provided with a flange, means acting through said flange for connecting the ring to the bottom of the upper chamber and means to connect the cover to the kettle body.

5. In a kettle, the combination of a body portion provided with an opening, a neck for the kettle about the opening, a flange about the free end of the neck, a cover for said opening provided with a flange and means to connect said cover over said opening operating through said flanges, the cover provided with a body part suspended from the cover flange into the kettle neck, a lower packing chamber in the top of the body part of the cover, an upper and larger chamber in said cover body, said cover body provided with an opening for a shaft concentric with said chambers, a ring for retaining the packing in the packing chamber having a bore for said shaft, a body portion of substantially the same diameter as the packing chamber and a flange of substantially the same diameter as the upper chamber, and means for connecting the flange of the ring to the bottom of the upper chamber.

6. In an enameled kettle, the combination of the main portion of the kettle provided with an opening, a neck about said opening and an outwardly turned flange at the end of said neck provided with a plurality of openings, a member for closing said opening in said kettle, a flange on the outside of said member provided with a plurality of openings corresponding to the openings on the flange of the kettle neck, bolts through the openings in said flanges removably connecting the member to the kettle, said member projecting into the throat of the kettle and being enameled upon its bottom side, the walls of said member being thicker than the walls of the kettle, an opening through said member through which a rotatable shaft passes into the interior of the kettle, a pocket in said member about said opening, a mass of packing in said pocket, a cylindrical member about said shaft projecting into said packing pocket to retain the packing in the pocket and means to connect said cylindrical member to said removable member.

7. In an enameled kettle, the combination of a body portion provided with an opening therein through which a portion of an agitating device projects, a neck about said opening and an outwardly turned flange on said neck, a sheet of enamel on the top of the flange, the inside of the neck and the inside of the kettle, a concavo-convex circular member provided with an annular flange extended outwardly from the top portion of the member, a sheet of enamel on the bottom of said flange and the convex portion of said member, means to connect the flange of the member to the flange on the kettle neck, with the enameled surfaces facing each other, packing means between said enameled surfaces, said member being provided with a central recess and a central opening therethrough, a shaft projecting through said opening, packing in said recess about said opening, a plug having a bore through which the shaft projects extending into said pocket, an outwardly extending flange about said plug and means engaging said flange for drawing said plug into the pocket and compressing the packing material therein.

In witness whereof, I have hereunto signed my name this 14 day of March, 1916.

RUDOLF F. GOECKE.

Copies of this patent may be obtained for five cents each, by addressing the "Commissioner of Patents, Washington, D. C."